US010311806B2

(12) United States Patent
Yu et al.

(10) Patent No.: US 10,311,806 B2
(45) Date of Patent: Jun. 4, 2019

(54) IMAGE PROCESSING METHOD AND IMAGE PROCESSING SYSTEM

(71) Applicant: BOE TECHNOLOGY GROUP CO., LTD., Beijing (CN)

(72) Inventors: Jing Yu, Beijing (CN); Ran Duan, Beijing (CN); Yanfu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/105,555

(22) PCT Filed: Sep. 8, 2015

(86) PCT No.: PCT/CN2015/089114

§ 371 (c)(1),
(2) Date: Jun. 16, 2016

(87) PCT Pub. No.: WO2016/173175

PCT Pub. Date: Nov. 3, 2016

(65) Prior Publication Data

US 2017/0140712 A1 May 18, 2017

(30) Foreign Application Priority Data

Apr. 28, 2015 (CN) .......................... 2015 1 0208908

(51) Int. Cl.
*G06T 17/00* (2006.01)
*G09G 3/36* (2006.01)
*G09G 3/20* (2006.01)

(52) U.S. Cl.
CPC ................. *G09G 3/36* (2013.01); *G09G 3/20* (2013.01); *G09G 2330/021* (2013.01);
(Continued)

(58) Field of Classification Search
CPC ......... G06T 17/20; G06T 15/00; G06T 15/04; G06T 2210/36; G09G 5/391
(Continued)

(56) References Cited

U.S. PATENT DOCUMENTS 7,924,297 B2 * 4/2011 Morikawa .............. G09G 5/005
345/660
2011/0254846 A1 * 10/2011 Lee ......................... G06F 3/011
345/427

(Continued)

FOREIGN PATENT DOCUMENTS

CN 101609659 A 12/2009
CN 102682744 A 9/2012

(Continued)

OTHER PUBLICATIONS

Wikipedia [Online] Optimum HDTV viewing distance, Nov. 19, 2013, Retrieved from the Internet <http://web.archive.org/web/20131119041632/https://en.wikipedia.org/wiki/>.*

(Continued)

*Primary Examiner* — Gordon G Liu
(74) *Attorney, Agent, or Firm* — Kinney & Lange, P.A.

(57) ABSTRACT

The present disclosure provides an image processing method and system. The method may include: acquiring an image to be displayed; determining a distance between a display device and a user; comparing the determined distance with a plurality of optimum watching distances respectively, wherein the optimum watching distances are acceptable shortest distances corresponding to different resolutions for the display device when the user watches images displayed on the display device in a full vision under a vision limit; and processing the acquired image for displaying, according to a result of the comparing.

9 Claims, 2 Drawing Sheets

(52) U.S. Cl.
CPC . *G09G 2330/022* (2013.01); *G09G 2330/023* (2013.01); *G09G 2340/0407* (2013.01); *G09G 2340/0414* (2013.01); *G09G 2354/00* (2013.01)

(58) Field of Classification Search
USPC .......................................................... 345/428
See application file for complete search history.

(56) References Cited

U.S. PATENT DOCUMENTS

| | | | | |
|---|---|---|---|---|
| 2012/0183208 | A1* | 7/2012 | Sharman | G06T 7/44 382/162 |
| 2013/0229482 | A1* | 9/2013 | Vilcovsky | H04N 7/144 348/14.07 |
| 2014/0035907 | A1* | 2/2014 | Hasegawa | G09G 5/14 345/419 |
| 2014/0219472 | A1 | 8/2014 | Huang et al. | |
| 2014/0232714 | A1 | 8/2014 | Hiraga | |

FOREIGN PATENT DOCUMENTS

| | | | |
|---|---|---|---|
| CN | 103002234 | A | 3/2013 |
| CN | 103139502 | A | 6/2013 |
| CN | 104361849 | A | 2/2015 |
| CN | 104809995 | A | 7/2015 |
| JP | 2012018351 | A | 1/2012 |

OTHER PUBLICATIONS

AVS (AVS Forum for Home Theater Discussions and Reviews) [online] Viewing distance chart (720p vs. 1080p vs. 4K vs. 8K and beyond), Jun. 19, 2012, Retrieved from the Internet <http://www.avsforum.com/forum/25-hdtv-technical/1416475-viewing-distancechart-720p-vs-1080p-vs-4k-vs-8k-beyond.html>.*

International Search Report and Written Opinion (including English translation of Written Opinion) dated Jan. 26, 2016, for corresponding PCT Application No. PCT/CN2015/089114.

"Calculation equation of a size of a flat television and an optimum watching distance," Baidu Library, http://wenku.baidu.com/view/9852e64ee45c3b3567ec8b44.html?re-view (accessed Sep. 10, 2016).

First Office Action dated Sep. 26, 2016, for corresponding Chinese Application No. 201510208908.6.

Second Chinese Office Action, for Chinese Patent Application No. 201510208908.6, dated Mar. 1, 2017, 23 pages.

Third Chinese Office Action, for Chinese Patent Application No. 201510208908.6, dated Jul. 28, 2017, 24 pages.

Wu, Wei, "Learning-based Image Enhancement Technology", Xidian University Press, pp. 34-37, Feb. 2013, 7 pages.

Chinese Rejection Decision, for Chinese Patent Application No. 201510208908.6, dated Dec. 4, 2017, 23 pages.

* cited by examiner

IMAGE PROCESSING METHOD AND IMAGE PROCESSING SYSTEM

CROSS-REFERENCE TO RELATED APPLICATION(S)

This application is a Section 371 National Stage Application of International Application No. PCT/CN2015/089114, filed on Sep. 8, 2015, entitled "IMAGE PROCESSING METHOD AND IMAGE PROCESSING SYSTEM", which has not yet published, which claims priority to Chinese Application No. 201510208908.6, filed on 28 Apr. 2015, the contents of which are incorporated herein by reference in its entirety.

TECHNICAL FIELD

The present disclosure relates to a field of display, in particular, relates to an image processing method and an image processing system.

BACKGROUND

With a development of display technology, display devices with a large size and a high resolution have become a trend.

Although liquid crystal display devices with a large size and a high resolution bring a superior visual experience when being used to display images, such display devices have a high power consumption, which may cause an increase of heat and a reduction of reliability. At present, the general resolution for sources to be displayed is at a level of high definition (HD), which corresponds to a resolution of 1280*720. Since the amount of the sources for high resolution display screens is very a few, it is required to perform an image processing procedure in a FPGA chip to match the resolution of the sources with the resolution of the display screen, in order to ensure a smooth output.

The power consumption of FPGA may include a statistic power consumption and a dynamic power consumption. The statistic power consumption is mainly caused by a leakage current of a transistor, in particular, including a leakage current from a source to a drain and a leakage current from a gate to a substrate base. The dynamic power consumption is mainly caused by the charging and discharging of a capacitor, in which the main influencing parameters are voltage, node capacitance and operating frequency. In a design for a traditional liquid crystal display device, the dynamic power consumption occupies 90% of the total power consumption or more. Accordingly, the reduction of dynamic power consumption is essential for the reduction of the total power consumption.

Generally, the problem related to the power consumption of the display device is solved by chip design. In other words, the problem related to the power consumption of the display device is usually solved by designing an intelligent chip and replacing the high power consumption chip with the intelligent chip. However, this may increase the costs for manufacturing the liquid crystal display device.

SUMMARY

The present disclosure provides an image processing method and an image processing system for solving the problem of a display device having a high power consumption.

An image processing method may comprises: acquiring an image to be displayed; determining a distance between a display device and a user who watches the display device; comparing the determined distance with a plurality of optimum watching distances for the display device respectively, wherein the optimum watching distances are acceptable shortest distances corresponding to different resolutions for the display device when the user watches images displayed on the display device in a full vision under a vision limit; and adjusting the resolution of the acquired image for displaying, according to a result of the comparing.

Further, the plurality of optimum watching distances may be determined by: determining a height of a screen of the display device; and determining the plurality of optimum watching distances according to the determined height of the screen.

Further, adjusting the resolution of the acquired image for displaying according to the result of the comparing may further include: determining one optimum watching distance corresponding to the determined distance between the display device and the user among the plurality of optimum watching distances, according to the result of the comparing; and adjusting the resolution of the acquired image for displaying according to a resolution corresponding to the one optimum watching distance.

Further, determining the plurality of optimum watching distances for the display device may further include: obtaining the height of the screen of the display device and the vertical resolutions corresponding to the screen; and determining the optimum watching distances based on the height and the vertical resolutions of the screen.

Further, the optimum watching distances can be determined based on the height and vertical resolutions of the screen, by: optimum watching distance=height of the screen/vertical resolution*N, wherein N is a correction parameter.

Further, the correction parameter N ranges from 768 to 3600.

Further, adjusting the resolution of the acquired image for displaying according to the result of the comparing may further include: determining an image adjusting mode according to the result of the comparing; and adjusting the resolution of the acquired image for displaying according to the determined image adjusting mode.

Further, the image adjusting mode may include an image scaling mode.

Further, the image adjusting mode may include at least one of a bilinear interpolation and a bicubic interpolation.

Further, adjusting the resolution of the acquired image for displaying according to the result of the comparing may further include: adjusting the resolution of the acquired image to a 8 k resolution, when the determined distance is less than or equal to a first optimum watching distance; adjusting the resolution of the acquired image to a resolution at a level of an ultra-high definition image, when the determined distance is greater than the first optimum watching distance but less than or equal to a second optimum watching distance; adjusting the resolution of the acquired image to a resolution at a level of a full high definition image, when the determined distance is greater than the second optimum watching distance but less than or equal to a third optimum watching distance; and adjusting the resolution of the acquired image to a resolution at a level of a high definition image, when the determined distance is greater than the third optimum watching distance.

An image processing system may comprise:

an image acquiring unit, configured to acquire an image to be displayed;

a distance determining unit, configured to determine a distance between a display device and a user who watches the display device;

a comparison unit, configured to compare the determined distance with a plurality of optimum watching distances for the display device respectively, wherein the optimum watching distances are acceptable shortest distances corresponding to different resolutions for the display device when the user watches images displayed on the display device in a full vision under a vision limit; and an image adjusting unit, configured to adjust the resolution of the acquired image for displaying, according to a result of the comparing.

Further, the distance determining unit is further configured to determine a height of a screen of the display device; and determine the plurality of optimum watching distances according to the determined height of the screen.

Further, the distance determining unit is further configured to determine the plurality of optimum watching distances based on the height of the screen of the display device and vertical resolutions corresponding to the screen, as: optimum watching distance=height of the screen/vertical resolution*N, wherein N is a correction parameter.

Further, the correction parameter N ranges from 720 to 3600.

Further, the image adjusting unit is configured to adjust the resolution of the acquired image to a 8 k resolution when the determined distance is less than or equal to a first optimum watching distance; to adjust the resolution of the acquired image to a resolution at a level of an ultra-high definition image when the determined distance is greater than the first optimum watching distance but less than or equal to a second optimum watching distance; to adjust the resolution of the acquired image to a resolution at a level of a full high definition image when the determined distance is greater than the second optimum watching distance but less than or equal to a third optimum watching distance; and to adjust the resolution of the acquired image to a resolution at a level of a high definition image when the determined distance is greater than the third optimum watching distance.

DETAILED DESCRIPTION

The principles, detailed descriptions and advantageous effects of the embodiments of present disclosure will now be described with reference to the drawings in details.

Figure 1:
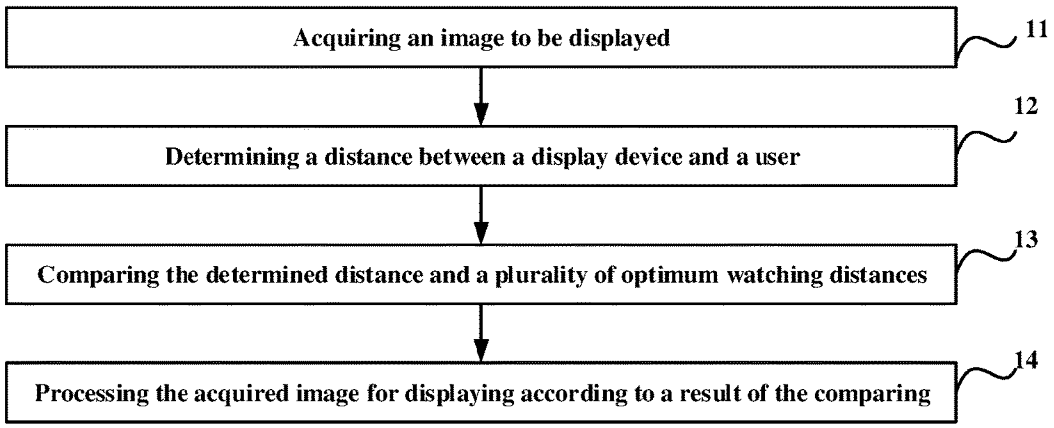
FIG. 1 is a flow chart illustrating the image processing method according to an embodiment of the disclosure.

In an embodiment, an image processing method is proposed. As shown in FIG. 1, the image processing method may include:

in step 11: acquiring an image to be displayed; and in step 12, determining a distance between a display device and a user.

The distance between a display device and a use who watches the display device can be calculated by an infrared sensing device or a camera.

The term "user" used herein is referred to a user who watches the display device. Further, it should be understood that although the display device according to the embodiment of the disclosure may be a liquid crystal display device, which is also taken as an example display device in the present disclosure, other display devices may also be used in the embodiment, which is not limited in the disclosure.

A preferred embodiment is to determine a vertical distance between a screen of the display device and the user by using an infrared sensing device or a camera, which enables determining a shortest distance between the display device and the user properly.

Preferably, the infrared sensing device or the camera may integrated into the display device or may be a separated device, which is not limited in the disclosure.

In step 13, the determined distance is compared with a plurality of optimum watching distance respectively.

The plurality of optimum watching distances are determined by firstly, determining a height of the screen of the display device; and secondly, determining the plurality of optimum watching distances according to the determined height of the screen.

A preferred embodiment is to determine each of the optimum watching distance as a multiple of the height of the screen H, for example, 1.5 H, 3 H and the like, which is not limited in the disclosure.

In step 14, the acquired image is processed for displaying according to a result of the comparing.

There are mainly two issues when the user watches images displayed on the display device:

Firstly, a size of the screen and the distance between the user and the display device seem to be very different due to the images displayed on the display device having different resolutions. In a case that the image displayed on the display device is a high definition image, if the distance between the display device and the user is too short, the user may feel uncomfortable; and if the distance between the display device and the user is too large, details of the image may be unobservable, thus deteriorating displaying effects and user's perception.

Secondly, although a large and high resolution display screen may provide the user with a superior visual and audio experience, a power consumption of the large and high resolution display screen is relatively high, which may cause an increase of heat and a reduction of reliability. At present, the normal resolution for sources to be displayed is at a level of HD (1280*720). Since the amount of the sources for high resolution display screens is very a few, it is required to perform an image processing procedure in a FPGA chip to match the resolution of the sources with the resolution of the display screen, in order to ensure a smooth output. Accordingly, the reduction of total power consumption can be achieved by reducing the power consumption of the FPGA.

Furthermore, the power consumption of FPGA may include a statistic power consumption and a dynamic power consumption. The statistic power consumption is mainly caused by a leakage current of a transistor, in particular, including a leakage current from a source to a drain and a leakage current from a gate to a substrate base. The dynamic power consumption is mainly caused by the charging and discharging of a capacitor, in which the main influencing parameters are voltage, node capacitance and operating frequency. In a design for a traditional display device, the dynamic power consumption occupies 90% of total power consumption or more. Accordingly, the reduction of dynamic power consumption is essential for the reduction of total power consumption.

Accordingly, the present disclosure may achieve a lower power consumption solution by determining a distance between the user and the display device, comparing the determined distance with a plurality of optimum watching distances respectively, and processing images according to a result of the comparing. The lower power consumption solution according to the present disclosure may achieve an effect of satisfying the requirements for user's visual and audio perception meanwhile reducing redundant and meaningless switching operations of the display device and reducing computing amounts and computing time.

In particular, the above image processing method may also include: determining the optimum watching distances corresponding to the display device.

In an embodiment, after determining the corresponding optimum watching distances, the method may further include: adjusting the image according to the optimum watching distances.

The optimum watching distances are acceptable shortest distances corresponding to different resolutions for the display device when the user watches images displayed on the display device in a full vision under a vision limit Further, the processing of the acquired image for displaying according to the result of the comparing may further include: determining one optimum watching distance corresponding to the determined distance between the display device and the user among the plurality of optimum watching distances, according to the result of the comparing; and processing the acquired image for displaying according to the one optimum watching distance.

The process of determining the plurality of optimum watching distances may further include:

firstly, obtaining a height of the screen of the display device and vertical resolutions corresponding to the screen, and secondly, determining the optimum watching distances based on the height and vertical resolutions of the screen.

In particular, the optimum watching distance can be determined based on the height and vertical resolution of the screen, as:

$$\text{optimum watching distance} = \text{height of the screen } H / \text{vertical resolution} * N,$$

wherein N is a correction parameter.

Further, the correction parameter N ranges from 720 to 3600.

In a preferred embodiment, the correction parameter N is 3400.

Figure 2:
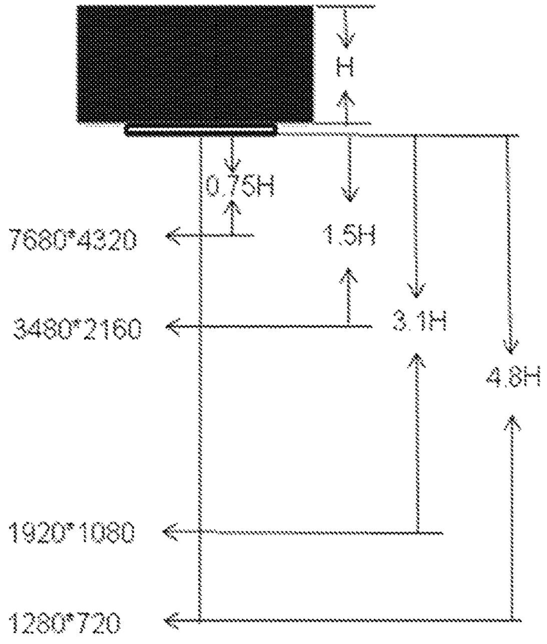
FIG. 2 are examples of optimum watching distances under different resolutions according to the embodiment of the disclosure.

The optimum watching distance is an acceptable shortest distances corresponding to one of different resolutions for the display device when the user watches images displayed on the display device in a full vision under a vision limit. When the user is watching an image with a corresponding resolution displayed on the display device at the optimum watching distance, an optimum watching experience may be perceived. The relationship between a size of the display screen and the optimum watching distances may depend on the resolutions of images displayed by the screen. In the above embodiment, the reduction of dynamic power consumption with keeping the watching experience unchanged may be achieved by comparing the determined distance with the optimum watching distances, respectively. FIG. 2 illustrates optimum watching distances corresponding to different resolutions under the same display device, according to the embodiment of the disclosure.

The processing of the acquired image according to the result of the comparing may further include:

determining an image adjusting mode to adjust the image, according to the result of the comparing.

In particular, the image adjusting mode may include an image scaling mode, which may include at least one of a bilinear interpolation and a bicubic interpolation and the like.

In particular, the processing of the acquired image according to the result of the comparing may include:

adjusting the resolution of the acquired image to a 8 k resolution, when the determined distance is less than or equal to a first optimum watching distance.

In this case, the user may be positioned at the optimum watching distance corresponding to a 8K resolution. At this time, a relatively complex image scaling mode can be selected to scale and optimize the image to be displayed. The resolution of the image can be adjusted to display a clear image which has a resolution closest to the 8K resolution. For example, in this case, the resolution of the image is improved to 7680*4320 which corresponds to the 8K resolution.

The selection of the image adjusting mode is not limited in this disclosure.

When the determined distance is greater than the first optimum watching distance but less than or equal to a second optimum watching distance, the resolution of the acquired image is adjusted to a resolution at a level of an ultra-high definition image.

In this case, for example, when the user is positioned at the optimum watching distance corresponding to an ultra-high definition (UHD) picture, a known complex image scaling mode can be selected to scale and optimize the image to be displayed. The resolution of the image can be adjusted to display a clear image which has a resolution closest to the UHD resolution.

When the determined distance is greater than the second optimum watching distance but less than or equal to a third optimum watching distance, the resolution of the acquired image is adjusted to a resolution at a level of a full high definition image In this case, when the user is positioned at the optimum watching distance corresponding to a full high definition (FHD) resolution, a relatively simple image scaling algorithm can be selected to scale and optimize the image to be displayed. The resolution of the image can be adjusted to display a clear image which has a resolution closest to the FHD resolution.

When the determined distance is greater than the third optimum watching distance, the resolution of the acquired image is adjusted to a resolution at a level of a high definition image.

In this case, when the user is positioned at the optimum watching distance corresponding to a high definition (HD) resolution, a relatively simple image scaling algorithm can be selected to scale and optimize the image to be displayed. For example, it is copied in a proportion of 1:6, and the resolution of the image can be adjusted to display a clear image which has a resolution closest to the HD resolution.

In the above embodiment, if the vertical height of the screen is H, the first optimum watching distance may be 1.5 H, the second optimum watching distance may be 3.1 H and the third optimum watching distance may be 4.8 H.

In implementing of the disclosure, different values for the optimum watching distances can also be possible. The above embodiment can ensure the quality of the display sources while displaying images. Further, it can also reduce the computing amount by selecting different resolution adjusting methods, which provide a preferred implementation being capable of reducing the power consumption of the display device. However, the implementation of the disclosure is not limited by the above embodiment.

Figure 3:
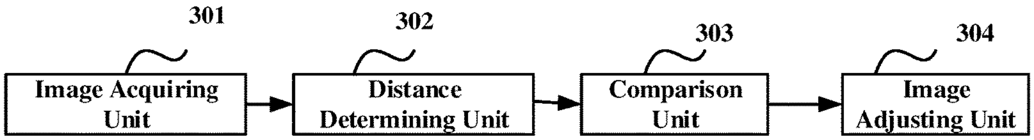
FIG. 3 is a block diagram illustrating the image processing system according to the embodiment of the disclosure.

Furthermore, an image processing system is also provided. As shown in FIG. 3, the system may include:

an image acquiring unit 301, configured to acquire an image to be displayed;

a distance determining unit 302, configured to determine a distance between a display device and a user who watches the display device;

a comparison unit 303, configured to compare the determined distance with a plurality of optimum watching distances for the display device, wherein the optimum watching distances are acceptable shortest distances corresponding to different resolutions for the display device when the user watches images displayed on the display device in a full vision under a vision limit; and an image adjusting unit 304, configured to adjust the resolution of the acquired image for displaying, according to a result of the comparing.

The distance determining unit 302 is further configured to determine a height of a screen of the display device; and determining the plurality of optimum watching distances according to the determined height of the screen.

In particular, the distance determining unit is further configured to determine the optimum watching distances based on the height of the screen and vertical resolutions correspond to the screen, as follows:

$$\text{optimum watching distance} = \text{height of the screen } H/\text{vertical resolution}*N,$$

wherein N is a correction parameter.

Further, the correction parameter N ranges from 720 to 3600.

In a preferred embodiment, the correction parameter N is 3400.

In particular, the image adjusting unit is further configured to: adjust the resolution of the acquired image to a 8 k resolution when the determined distance is less than or equal to a first optimum watching distance; adjust the resolution of the acquired image to a resolution at a level of an ultra-high definition image when the determined distance is greater than the first optimum watching distance but less than or equal to a second optimum watching distance; adjust the resolution of the acquired image to a resolution at a level of a full high definition image when the determined distance is greater than the second optimum watching distance but less than or equal to a third optimum watching distance; adjust the resolution of the acquired image to a resolution at a level of a high definition image when the determined distance is greater than the third optimum watching distance.

Those skilled in the art should understand that the embodiment of the present disclosure can be provided as a method, an apparatus (device), or a computer program product. Accordingly, the present disclosure can be implemented in the form of hardware, software or a combination of hardware and software. Furthermore, the present disclosure can be also implemented as a computer program product which is embodied in one or more computer readable storage medium (including but not limited to, a disk, a ROM, an optical storage and the like) including computer-readable codes.

Solutions according to the embodiments of the present disclosure may achieve the effects of reducing the power consumption of a display device while displaying an image, by determining a distance between a display device and a user who watches the display device, comparing the determined distance with a plurality of optimum watching distances, and adjusting the resolution of the image according to a result of the comparing. The solutions can also reduce the computing amount by selecting different resolution adjusting modes The present application is described with a reference to the flow charts and block diagrams of the method, the apparatus (device) and the computer program product according to the embodiment of the disclosure. It should be understood that each step or block of the flow charts and block diagrams or its combination can be implemented as computer program instructions. These computer program instructions can be provided to a general purpose computer, a special processor, an embedded processor or processors of other programmable data processing devices to form a machine such that apparatus for implementing functions designated by one or more step(s)/block(s) of the flow charts/block diagrams can be implemented by performing these computer program instructions via the processors of the computer or other programmable data processing devices.

These computer program instructions can also be stored in a computer readable storage, which can direct the computer or other programmable data processing devices to operate in a certain manner such that instructions stored in the computer readable storage may create a manufacture including instruction means, which can implement the functions designated by one or more step(s)/block(s) of the flow charts/block diagrams.

These computer program instructions can also be loaded to a computer or other programmable data processing devices, such that a series of operations can be performed on the computer or other programmable data processing devices to create computer-implemented procedures. Thus, the instructions performed on the computer or other programmable data processing devices may provide steps of implementing the functions designated by one or more step(s)/block(s) of the flow charts/block diagrams.

Although the present invention is described above with reference to preferable embodiments, such embodiment can be revised and/or modified in various ways by the skilled person in view of the concept of the invention. Thus, it should be understood that the intention is intended to cover all modifications, equivalents, and alternatives falling within the scope of the disclosure including aspects defined in the claims.

Obviously, it will be understood by those skilled in the art that various changes in form and details may be made therein without departing from the spirit and scope of the present disclosure as defined by the appended claims and their equivalents.

We claim:

1. An image processing method, comprising:

determining a plurality of optimum watching distances for a plurality of image resolutions for displaying on a display device;

determining a plurality of distance ranges separated by the plurality of optimum watching distances, wherein each distance range has one of the plurality of optimum watching distances as its lower limit so as to establish a correspondence between the plurality of distance ranges and the plurality of image resolutions;

determining a target distance range of a plurality of distance ranges in which a distance between the display device and a user who watches the display device resides;

determining an adjusted resolution for images to be displayed on the display device according to the target distance range on the basis of the correspondence; and adjusting images to be displayed on the device to the adjusted resolution.

2. The method of claim 1, wherein determining the plurality of optimum watching distances further comprises:

obtaining the height of the screen of the display device and vertical resolutions of the screen; and determining the optimum watching distances based on the height and the vertical resolutions of the screen.

3. The method of claim 1, wherein the optimum watching distance=(height of the screen of the display device/ vertical resolution of the image)*N, wherein N is a correction parameter that ranges from 720 to 3600.

4. The method of claim 1, wherein adjusting the acquired image for displaying further comprises:

determining an image scaling mode according to the adjusted resolution; and adjusting the resolution of the acquired image for displaying according to the determined image scaling mode.

5. The method of claim 4, wherein the image scaling mode comprises:

a bilinear interpolation; and/or a bicubic interpolation.

6. The method of claim 1, wherein adjusting the acquired image for displaying further comprises:

adjusting the resolution of the acquired image to a 8 k resolution when the target distance range is greater than a minimum optimum watching distance but less than or equal to a first optimum watching distance;

adjusting the resolution of the acquired image to a resolution at a level of an ultra-high definition image when the target distance range is greater than the first optimum watching distance but less than or equal to a second optimum watching distance;

adjusting the resolution of the acquired image to a resolution at a level of a full high definition image when the target distance range is greater than the second optimum watching distance but less than or equal to a third optimum watching distance; and adjusting the resolution of the acquired image to a resolution at a level of a high definition image when the target distance range is greater than the third optimum watching distance.

7. An image processing system configured to:

determine a plurality of optimum watching distances for a plurality of image resolutions for displaying on a display device determine a plurality of distance ranges separated by the plurality of optimum watching distances, wherein each distance range has one of the plurality of optimum watching distances as its lower limit so as to establish a correspondence between the plurality of distance ranges and the plurality of image resolutions;

determine a target distance range of the plurality of distance ranges in which a distance between the display device and a user who watches the display device resides;

determine an adjusted resolution for images to be displayed on the display device according to the target distance range on the basis of the correspondence; and adjust images to be displayed on the device to the adjusted resolution.

8. The system of claim 7, wherein the optimum watching distance=(height of the screen of the display device/ vertical resolution of the image)*N, wherein N is a correction parameter that ranges from 720 to 3600.

9. The system of claim 7, further configured to adjust the resolution of the acquired image to a 8 k resolution when the target distance range is greater than a minimum optimum watching distance but less than or equal to a first optimum watching distance; to adjust the resolution of the acquired image to a resolution at a level of an ultra-high definition image when the target distance range is greater than the first optimum watching distance but less than or equal to a second optimum watching distance; to adjust the resolution of the acquired image to a resolution at a level of a full high definition image when the target distance range is greater than the second optimum watching distance but less than or equal to a third optimum watching distance; and to adjust the resolution of the acquired image to a resolution at a level of a high definition image when the target distance range is greater than the third optimum watching distance.

* * * * *